(12) United States Patent
Winter et al.

(10) Patent No.: US 12,103,795 B2
(45) Date of Patent: Oct. 1, 2024

(54) SYSTEM AND METHOD FOR TRANSPORTING GOODS

(71) Applicant: SEW-EURODRIVE GMBH & CO. KG, Bruchsal (DE)

(72) Inventors: Maximilian Winter, Heidelberg (DE); Friedrich Lagier, Karlsruhe (DE); Frank Schönung, Graben-Neudorf (DE); Josef Schmidt, Graben-Neudorf (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 332 days.

(21) Appl. No.: 17/768,390

(22) PCT Filed: Sep. 30, 2020

(86) PCT No.: PCT/EP2020/025440
§ 371 (c)(1),
(2) Date: Apr. 12, 2022

(87) PCT Pub. No.: WO2021/073771
PCT Pub. Date: Apr. 22, 2021

(65) Prior Publication Data
US 2023/0294935 A1     Sep. 21, 2023

(30) Foreign Application Priority Data
Oct. 15, 2019   (DE) .......................... 102019007151.4

(51) Int. Cl.
*B65G 67/02*     (2006.01)
(52) U.S. Cl.
CPC .................................. *B65G 67/02* (2013.01)

(58) Field of Classification Search
CPC .... B65G 1/0414; B65G 1/0492; B65G 1/065; B65G 67/02; B66F 9/063; H01L 21/67775
See application file for complete search history.

(56) References Cited

U.S. PATENT DOCUMENTS 6,325,586 B1 * 12/2001 Loy .......................... B65G 1/02
                                                         414/281
10,894,664 B1 *  1/2021 Brady .................. B65G 1/1378
(Continued)

FOREIGN PATENT DOCUMENTS

CH           705000 A2    11/2012
DE    102012203575 A1     9/2013
(Continued)

OTHER PUBLICATIONS

International Report on Patentability issued in corresponding International Application No. PCT/EP2020/025440 dated Apr. 19, 2022, pp. 1-6, English Translation.

(Continued)

*Primary Examiner* — Glenn F Myers
(74) *Attorney, Agent, or Firm* — Carter, DeLuca & Farrell LLP

(57) ABSTRACT

A system for transporting goods, includes a transport container for holding goods, a driverless transport vehicle for transporting the transport container, and a transfer station, on which the transport container is positionable. The transport container includes a locking device, which is lockable to a first locking unit of the driverless transport vehicle, and to a second locking unit of the transfer station. In a method for transporting goods: the locking device of the transport container is locked to the first locking unit; the transport container is transported by the driverless transport vehicle to the transfer station; the locking device of the transport (Continued)

container is unlocked from the first locking unit; and the locking device of the transport container is locked to the second locking unit.

18 Claims, 7 Drawing Sheets

(56) References Cited

U.S. PATENT DOCUMENTS

| | | | | |
|---|---|---|---|---|
| 2010/0290873 | A1* | 11/2010 | Bonora | H01L 21/67769 414/225.01 |
| 2014/0214234 | A1* | 7/2014 | Worsley | G05B 19/41895 701/2 |
| 2019/0092612 | A1* | 3/2019 | Soder | B65G 67/24 |

FOREIGN PATENT DOCUMENTS

| | | |
|---|---|---|
| DE | 102012025152 A1 | 6/2014 |
| DE | 102013018268 A1 | 4/2015 |
| EP | 3287399 A1 | 2/2018 |
| EP | 3287400 A1 | 2/2018 |
| GB | 2544657 A | 5/2017 |
| WO | 2018052434 A1 | 3/2018 |

OTHER PUBLICATIONS

International Search Report issued in corresponding International Application No. PCT/EP2020/025440 dated Dec. 18, 2020, pp. 1-3, English Translation.
European Office Action issued in corresponding EP Patent Application No. 20790190.1, dated Jul. 3, 2024, with English translation.

* cited by examiner

SYSTEM AND METHOD FOR TRANSPORTING GOODS

FIELD OF THE INVENTION

The present invention relates to a system for transporting goods, which includes, for example, at least one transport container for holding goods, at least one driverless transport vehicle for transporting the at least one transport container, and at least one transfer station, on which the at least one transport container is able to be positioned. The present invention also relates to a method for transporting goods with the aid of a system described herein.

BACKGROUND INFORMATION

Certain systems for transporting goods include driverless transport vehicles. Transport containers, such as boxes or pallets, may be transported, for example, to specific transfer stations, with the aid of such a driverless transport vehicle. The transport containers are used for holding the goods to be transported. Transport containers having the goods to be transported are positioned by the driverless transport vehicles on a transfer station and are available there to a recipient.

A driverless transport vehicle, which includes a chassis and rollers, e.g., steering rollers, positioned on the chassis, is described in German Patent Document No. 10 2012 025 152. In addition, a drive unit is provided, which includes a wheel driven by an electric motor.

A driverless transport system for a manufacturing and/or packaging facility is described in German Patent Document No. 10 2012 203 575. The driverless transport system includes a plurality of transport vehicles for transporting pallets. The transport vehicles are used, e.g., for transporting empty pallets and ready-packaged pallets inside the manufacturing and/or packaging facility.

At present, the delivery of goods to private recipients generates a high degree of complexity for suppliers, associated with high costs. In this context, it is, for example, problematic that private recipients receive goods irregularly, and that private recipients are often not personally present, in order to accept the goods ordered. As a result, goods ordered must be delivered a plurality of times and stored in the meantime.

SUMMARY

Example embodiments of the present invention provide a system and a method for transporting goods, in which, for example, unauthorized persons should be prevented from removing the transport container during transport, as well as after it is positioned on the transfer station.

According to an example embodiment of the present invention, a system for transporting goods includes at least one transport container for holding goods, at least one driverless transport vehicle for transporting the at least one transport container, and at least one transfer station. The at least one transport container is able to be positioned on the transfer station.

According to example embodiments of the present invention, the at least one transport container includes a locking device. In addition, the driverless transport vehicle includes a first locking unit, and the transfer station includes a second locking unit. In this context, the locking device of the transport container may be locked to the first locking unit of the at least one driverless transport vehicle, as well as to the second locking unit of the at least one transfer station.

By locking the locking device to the first locking unit, the transport container is locked in position on the driverless transport vehicle and therefore protected from removal by unauthorized persons during the transport to the transfer station. By locking the locking device to the second locking unit, the transport container is locked in position on the transfer station and, therefore, also protected from removal by unauthorized persons, after it is positioned on the transfer station. Thus, it is possible to position the transport container on the transfer station and make it available to a recipient, even if the recipient is not present at the transfer station. Consequently, removal of the transport container by unauthorized persons, that is, theft of the transport container, is, for example, prevented during transport and after the positioning on the transfer station. The system is suitable, for example, for delivering goods to a private recipient, who is not personally present at the time of the delivery. The recipient receives the delivered goods at the transfer station at a later time.

According to example embodiments, the at least one driverless transport vehicle includes a control unit. With the aid of the control unit, the locking device of the transport container may be unlocked from the first locking unit of the transport vehicle. With the aid of the control unit, the locking device of the transport container may also be unlocked from the second locking unit of the transfer station. Thus, the driverless transport vehicle is able to end the locking of the transport container to the driverless transport vehicle, as well as to the transfer station.

According to example embodiments, the locking device is configured such that in the absence of the control unit, the locking device is automatically locked to the first locking unit or to the second locking unit. Thus, if the control unit is removed from the locking device, then the transport container is automatically locked in position on the driverless transport vehicle or on the transfer station.

According to example embodiments, the locking device may be locked to the first locking unit with the aid of the control unit. The locking device may also be locked to the second locking unit with the aid of the control unit. Consequently, the transport container may be deliberately locked in position on the driverless transport vehicle, as well as on the transfer station, using the control unit.

According to example embodiments, the at least one driverless transport vehicle includes a lifting unit. With the aid of the lifting unit, the at least one transport container is movable in a vertical direction relative to a chassis of the driverless transport vehicle. Using such a lifting movement, the transport container may be positioned, e.g., by the driverless transport vehicle, onto the transfer station, even if the transfer station has a height in the vertical direction different from the driverless transport vehicle. In addition, such a lifting movement allows the locking device of the transport container to be removed from the locking units of the driverless transport vehicle and the transfer station, in the vertical direction, and also allows it to be joined to the locking units of the driverless transport vehicle and the transfer station in the vertical direction.

According to example embodiments, the lifting unit includes a lifting platform for raising and lowering the at least one transport container. The lifting unit optionally includes a scale for measuring a weight of the at least one transport container. A weight of the goods held by the at least one transport container is calculated as a difference of the measured weight of the transport container and an empty weight of the transport container.

According to example embodiments, the at least one driverless transport vehicle includes a communications interface for communicating with the at least one transport container and/or with the at least one transfer station. As an option, communication with external devices, such as a cellular phone, is also possible with the aid of the communications interface. For example, the communications interface is constructed to be wired or wireless. For example, the measured weight of the at least one transport container, as well as the calculated weight of the goods held by the at least one transport container, may be transmitted to the transport container, as well as to the transfer station, via the communications interface.

According to example embodiments, the at least one transfer station includes a communications interface for communicating with the at least one transport container and/or with the at least one driverless transport vehicle. As an option, communication with external devices, such as a cellular phone, is also possible with the aid of the communications interface. For example, the communications interface is constructed to be wired or wireless. For example, a status signal may be transmitted to the transport container, as well as to the driverless transport vehicle, via the communications interface. The status signal indicates, for example, if another transport container is already situated on the transfer station, or if the transfer station is ready to receive the transport container.

According to example embodiments, the at least one transport container includes a communications interface for communicating with the at least one driverless transport vehicle and/or with the at least one transfer station. As an option, communication with external devices, such as a cellular phone, is also possible with the aid of the communications interface. For example, the communications interface is constructed to be wired or wireless. For example, information about the contents of the transport container, as well as about the destination and the recipient of the transport container, may be transmitted to the driverless transport vehicle via the communications interface. Thus, there is the option of loading the transport container independently of the driverless transport vehicle. The driverless transport vehicle, for example, receives an order for transport from the transport container itself. For example, the weight of the at least one transport container, as well as the calculated weight of the goods held by the at least one transport container, may be transmitted to the transfer station via the communications interface.

According to example embodiments, the at least one transport container includes a display unit for displaying information items. For example, a name of the recipient of the goods, the measured weight of the at least one transport container, as well as the calculated weight of the goods held by the at least one transport container, are displayed on the display unit. In addition, it is possible for the information items to be transmitted via a communications interface of the transport container, to a cellular phone of the authorized recipient. For example, the cellular phone is used as a display unit.

According to example embodiments, the at least one driverless transport vehicle includes a display unit for displaying information items. For example, a name of the recipient of the goods, the measured weight of the at least one transport container, as well as the calculated weight of the goods held by the at least one transport container, are displayed on the display unit. In addition, it is possible for the information items to be transmitted via a communications interface of the driverless transport vehicle to a cellular phone of the authorized recipient. For example, the cellular phone is used as a display unit.

According to example embodiments, the at least one transport container includes a basic housing and a cover, with the aid of which the basic housing may be closed. In this context, the basic housing and the cover surround a hollow space, into which goods to be transported may be placed. For example, the goods to be transported are surrounded by the basic housing and the cover and are therefore protected from environmental influences, such as exposure to sunlight, wind, and rain.

According to example embodiments, the at least one transport container includes a locking module, with the aid of which the cover may be locked to the basic housing. For example, the locking module is configured such that the cover is only to be opened by persons authorized for that. Suitable safety devices are provided to check if a person is authorized to open the cover, for example, a fingerprint scanner, a keyboard for inputting a PIN code, a wireless interface, such as Bluetooth or WLAN, for communicating with a cellular phone, etc. The transport container includes an electrical energy store, for example, in the form of a storage battery, in order to power the safety devices. In this manner, unauthorized persons are, for example, prevented from removing the goods from the transport container during transport, as well as after it is positioned on the transfer station. Consequently, the goods situated in the transport container are protected from theft.

According to an example embodiment of the present invention, in a method for transporting goods with the aid of a system for transmitting goods, the locking device of the transport container is initially locked to the first locking unit of the driverless transport vehicle. The transport container is subsequently transported by the driverless transport vehicle to the transfer station. The locking device of the transport container is then unlocked from the first locking unit of the driverless transport vehicle, and the locking device of the transport container is locked to the second locking unit of the transfer station.

By locking the locking device to the first locking unit, the transport container is locked in position on the driverless transport vehicle and therefore protected from removal by unauthorized persons during the transport to the transfer station. By locking the locking device to the second locking unit, the transport container is locked in position on the transfer station and is, therefore, also protected from removal by unauthorized persons, after it is positioned on the transfer station. Thus, the transport container is positioned on the transfer station and made available to a recipient. For example, the presence of the recipient at the transfer station is not required. Consequently, removal of the transport container by unauthorized persons, e.g., theft of the transport container, during transport and after the positioning on the transfer station, is, for example, prevented.

According to example embodiments, goods to be transported are placed into a hollow space of the transport container, before the transport container is transported by the driverless transport vehicle to the transfer station. In this manner, goods may be transported, for example, from a warehouse to the transfer station and to the recipient. The method is suitable, e.g., for delivering goods to a private recipient, who is not personally present at the time of the delivery. The recipient then receives the delivered goods at the transfer station at a later time.

According to example embodiments, goods to be transported are placed into a hollow space of the transport container, after the locking device of the transport container is locked to the second locking unit of the transfer station. In this manner, the goods may be picked up from the transfer station and transported, for example, to a warehouse. The method is particularly suitable for picking up goods of a private sender, who is not personally present at the time of the pick-up. The sender places the goods into the transport container at the transfer station, which is then picked up at a later time. The goods may be, for example, returns or also household trash.

According to example embodiments, after the locking device of the transport container is locked to the second locking unit of the transfer station, the locking device of the transport container is unlocked again from the second locking unit of the transfer station at a later time, and the locking device of the transport container is locked to the first locking unit of the driverless transport vehicle. The transport container is subsequently transported away from the transfer station by the driverless transport vehicle. Thus, the transport container is made available for pickup at the transfer station. The presence of the recipient at the transfer station is, for example, not required. In this context, unauthorized persons are, for example, prevented from removing, e.g., stealing, the transport container during the positioning on the transfer station, as well as during transport.

Further features and aspects of example embodiments of the present invention are explained in greater detail below with reference to the appended schematic Figures.

DETAILED DESCRIPTION

Figure 1:
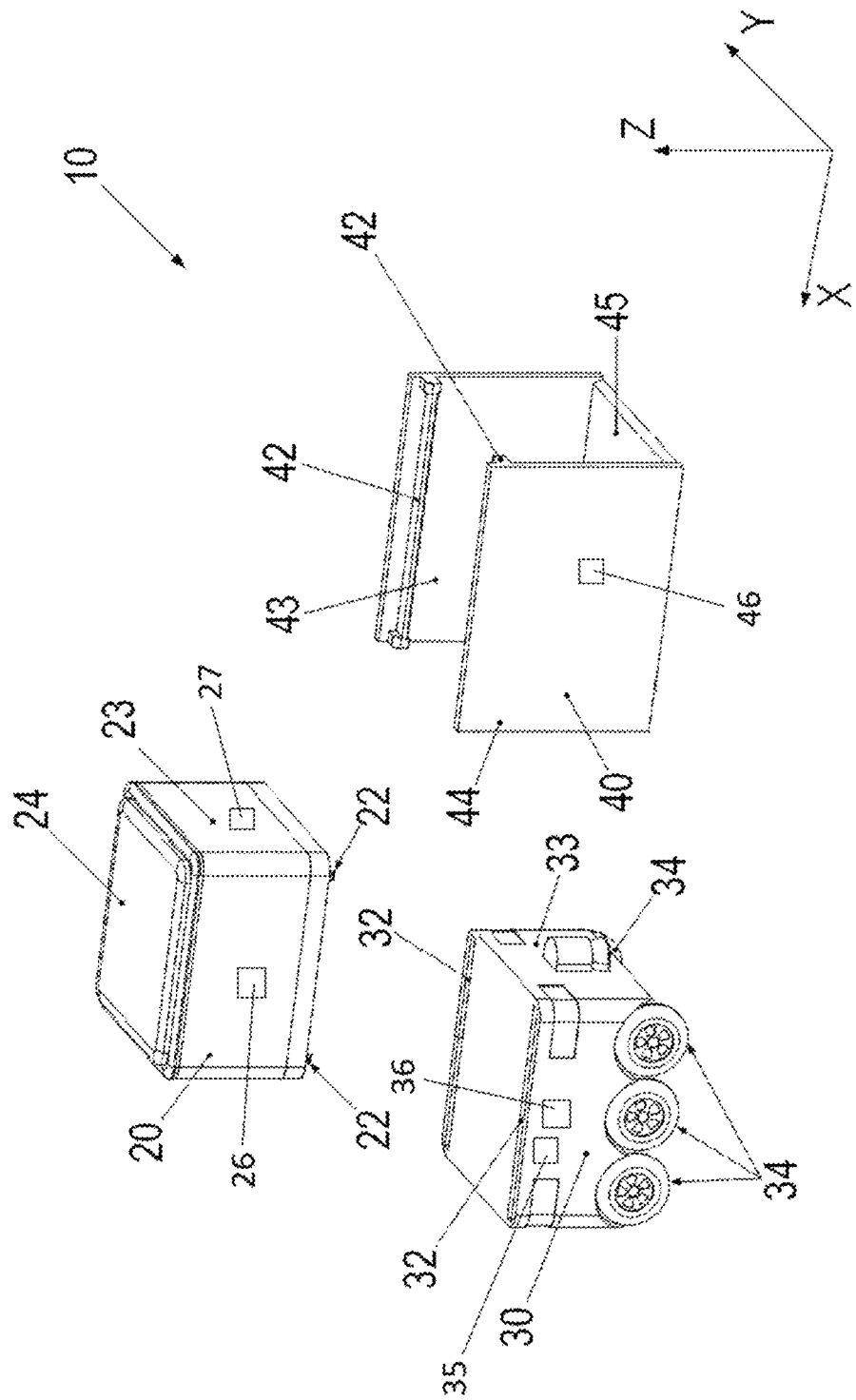
FIG. 1 is an exploded view of a system for transporting goods.

FIG. 1 is an exploded view of a system 10 for transporting goods. System 10 includes a transport container 20 for holding goods, a driverless transport vehicle 30 for transporting transport container 20, and a transfer station 40, on which transport container 20 may be positioned. System 10 is used for delivering goods to a private recipient. To that end, transfer station 40 is situated, for example, in front of a residential building, in which the private recipient lives.

Transfer station 40 is formed approximately in the shape of a U-profile and has a first side 43, a second side 44, and a third side 45, which connects first side 43 and second side 44. Third side 45 is approximately planar and extends perpendicularly to a vertical direction Z. Sides 43, 44 are each approximately planar and extend perpendicularly to a transverse direction Y.

In this context, vertical direction Z extends perpendicularly to the ground. Transverse direction Y extends perpendicularly to vertical direction Z. A longitudinal direction X extends perpendicularly to transverse direction Y and perpendicularly to vertical direction Z. Therefore, longitudinal direction X and transverse direction Y extend horizontally and perpendicularly to the ground.

Third side 45 is anchored securely in the ground. Consequently, transfer station 40 is protected against theft. First side 43 and second side 44 are set apart from each other in transverse direction Y. Therefore, a through-region, which extends in longitudinal direction X, is formed between sides 43, 44. A dimension of the through-region in transverse direction Y is selected such that it is possible for driverless transport vehicle 30 to pull into the through-region. In this context, it is possible for driverless transport vehicle 30 to pull into the through-region and to pull out of the through-region from both sides.

A support bar 42 is attached to both first side 43 and second side 44. For example, support bars 42 are positioned in a region of sides 43, 44 opposite to third side 45 and extend into the through-region. Support bars 42 form a second locking unit of transfer station 40.

Driverless transport vehicle 30 includes a chassis 33, as well as a plurality of wheels 34. The driverless transport vehicle 30 includes six wheels 34. At least a portion of wheels 34 may be driven by a motor. Driverless transport vehicle 30 also includes an electrical energy store for powering the motor. At least a portion of wheels 34 are steerable. Alternatively, driverless transport vehicle 30 has differential steering. For example, wheels 34 are not steerable, but driverless transport vehicle 30 may be steered, using different speeds of the wheels 34 on the two sides, in a manner similar to a chain drive of a tank or an excavator. For example, driverless transport vehicle 30 moves in longitudinal direction X.

Driverless transport vehicle 30 further includes a lifting unit 35, with the aid of which a transport container 20 situated on transport vehicle 30 may be moved in the vertical direction Z relative to chassis 33. To that end, the lifting unit 35 includes, for example, a lifting platform.

Driverless transport vehicle 30 also includes two grooves 32, which are set apart from each other. For example, grooves 32 are set apart from each other in transverse direction Y. In this context, grooves 32 form a first locking unit of driverless transport vehicle 30.

Transport container 20 includes a basic housing 23 and a cover 24. For example, basic housing 23 is closed with the aid of cover 24. Basic housing 23 and cover 24 surround a hollow space 25, into which goods to be transported may be placed. Transport container 20 also includes a locking module 27, with the aid of which cover 24 may be locked to basic housing 23. When cover 24 is locked to basic housing 23, goods situated in hollow space 25 are protected from unauthorized access.

Transport container 20 also includes a locking device. The locking device includes a plurality of movable latches 22, which interact with grooves 32 of driverless transport vehicle 30, as well as with support bars 42 of transfer station 40.

The locking device of transport container 20 may be locked to the first locking unit of driverless transport vehicle 30. In order to lock, latches 22 of the locking device engage with grooves 32, which form the first locking unit of driverless transport vehicle 30.

The locking device of transport container 20 may also be locked to the second locking unit of transfer station 40. In order to lock, latches 22 of the locking device engage with support bars 42, which form the second locking unit of transfer station 40.

In the following, the method for transporting goods with the aid of the system 10 for transporting goods is explained in light of an example. The goods, which are to be transported to transfer station 40, are initially placed into hollow space 25 of transport container 20. Cover 23 of transport container 20 is subsequently closed and locked to basic housing 23 by the locking module.

The locking device of transport container 20 is locked to the first locking unit of driverless transport vehicle 30. Transport container 20 is then transported by driverless transport vehicle 30 to transfer station 40.

Figure 2:
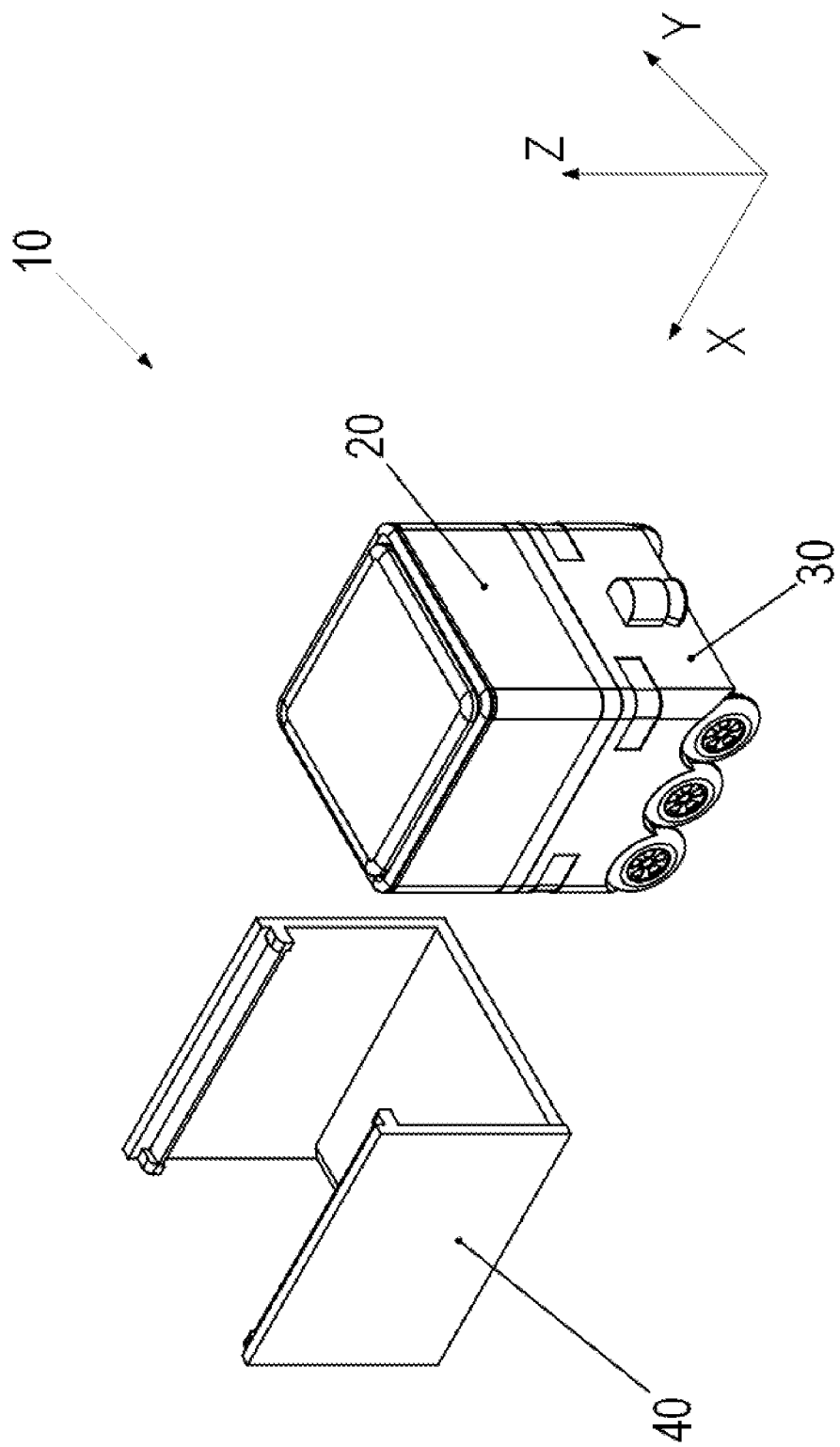
FIG. 2 illustrates the system illustrated in FIG. 1, during the transport of a transport container to a transfer station.

FIG. 2 shows the system 10 illustrated in FIG. 1 during the transport of transport container 20 on driverless transport vehicle 30 to transfer station 40. Driverless transport vehicle 30 moves, for example, towards transfer station 40 in longitudinal direction X.

During the transport, the locking device of transport container 20 is locked to the first locking unit of driverless transport vehicle 30. For example, the latches 22 of the locking device engage with grooves 32, which form the first locking unit of driverless transport vehicle 30. For example, transport container 20 is situated above driverless transport vehicle 30 in vertical direction Z.

Figure 3:
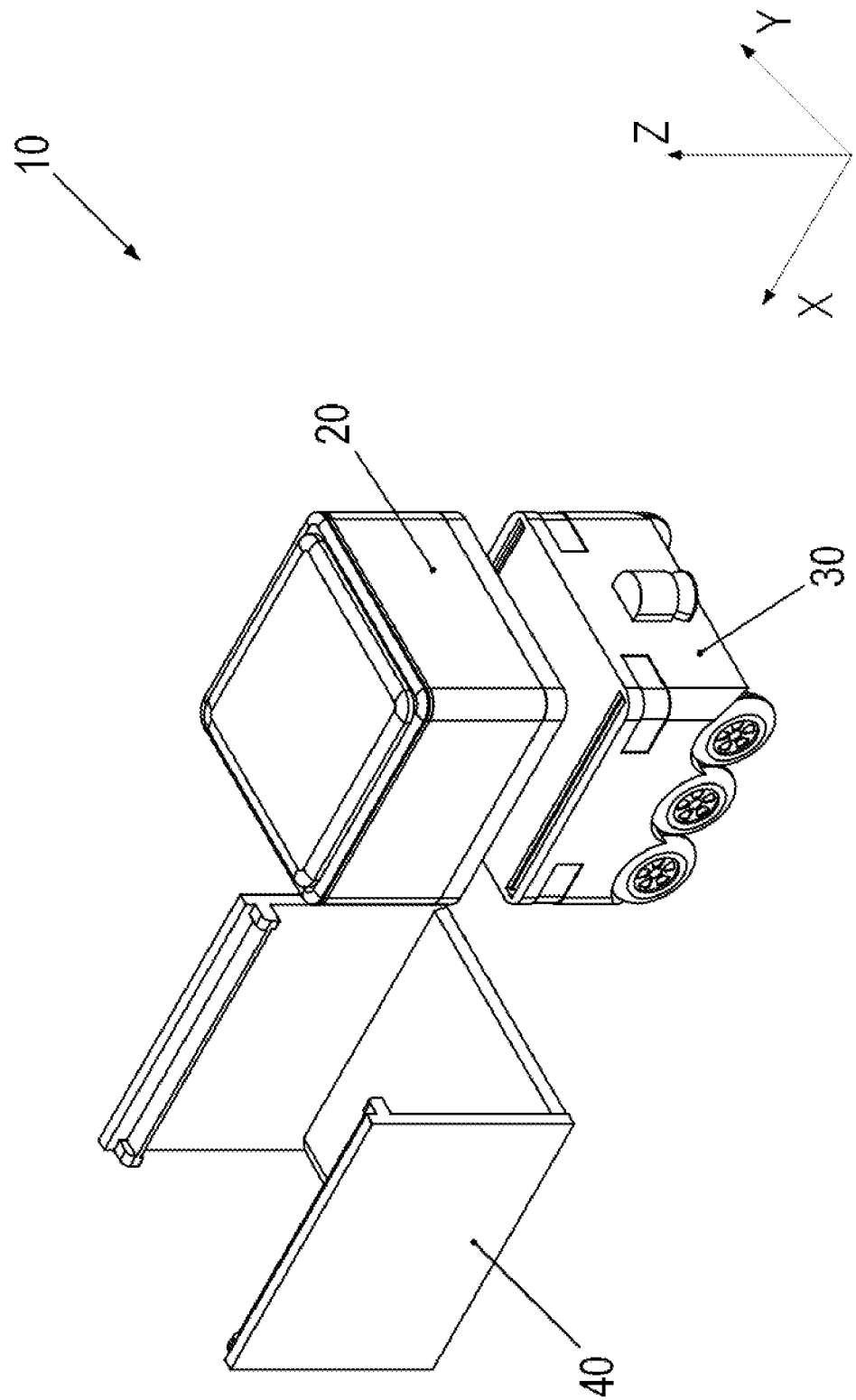
FIG. 3 illustrates the system illustrated in FIG. 1, including a raised transport container.

FIG. 3 shows the system illustrated in FIG. 1, including a raised transport container 20, in the immediate vicinity of transfer station 40. The locking device of transport container 20 is unlocked from the first locking unit of driverless transport vehicle 30, and transport container 20 is raised by the lifting unit of driverless transport vehicle 30, e.g., moved upwards in vertical direction Z.

Driverless transport vehicle 30 includes a control unit, in order to unlock the locking device from the first locking unit. With the aid of the control unit, the locking device may also be unlocked from the second locking unit.

Subsequently, driverless transport vehicle 30 moves further in longitudinal direction X and travels into transfer station 40.

Figure 4:
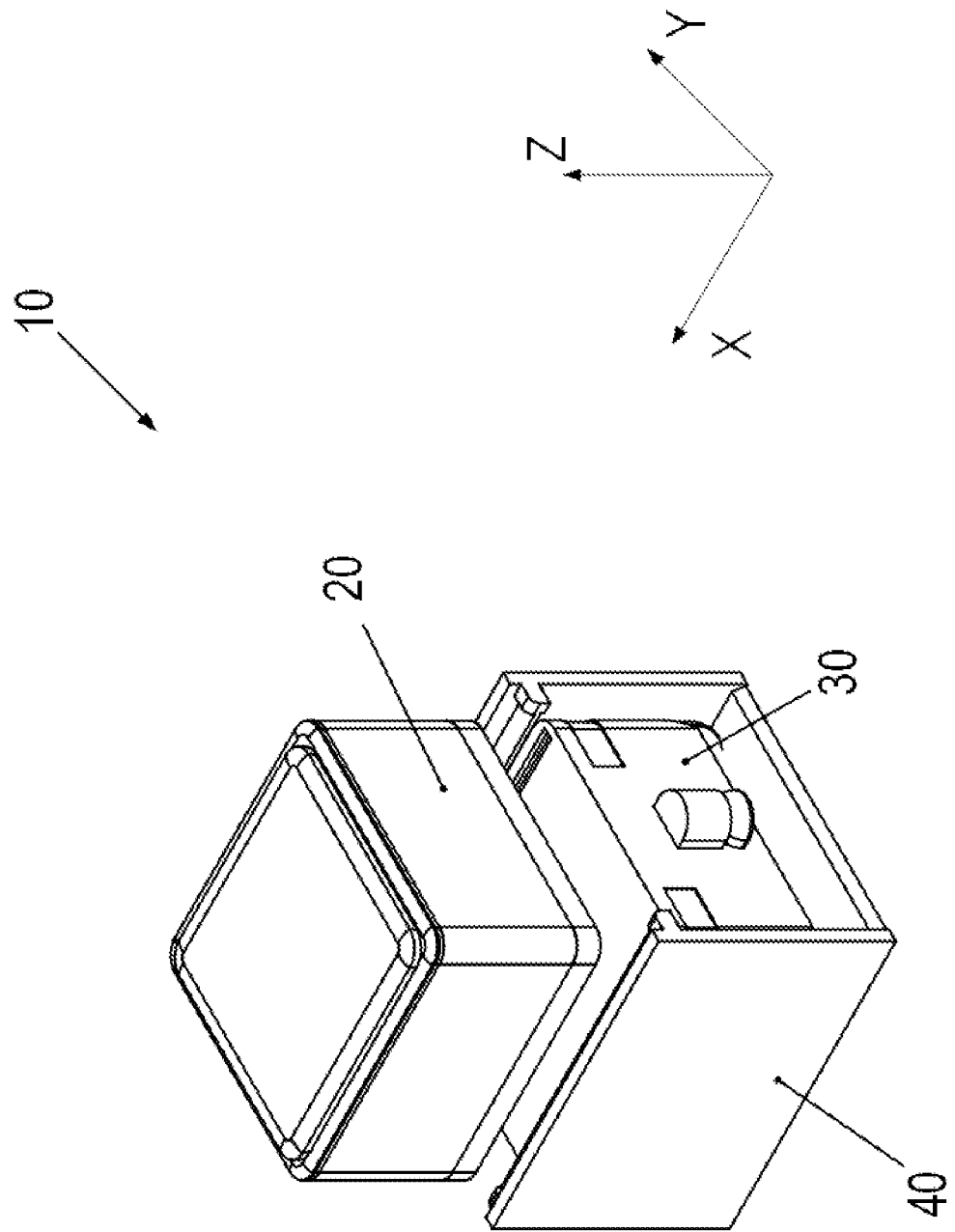
FIG. 4 illustrates the system illustrated in FIG. 1, including a driverless transport vehicle situated in the transfer station.

FIG. 4 shows the system 10 illustrated in FIG. 1, including a driverless transport vehicle 30 situated in transfer station 40. For example, transport container 20 is positioned above transfer station 40 in vertical direction Z.

Figure 5:
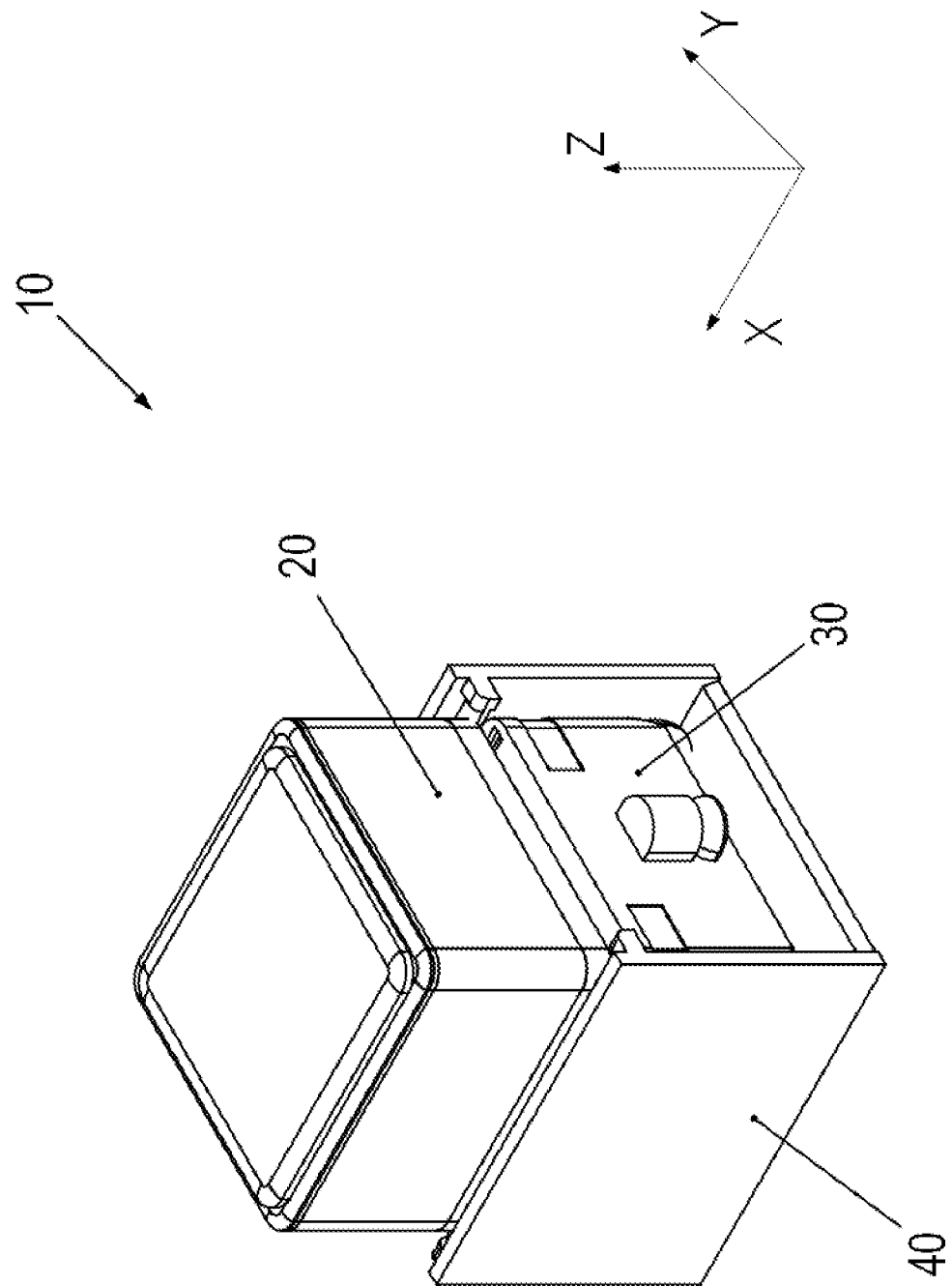
FIG. 5 illustrates the system illustrated in FIG. 1, including a transport container set down on the transfer station.

Transport container 20 is subsequently lowered by the lifting unit of driverless transport vehicle 30, e.g., moved downwards in vertical direction Z, and set down on transfer station 40. FIG. 5 shows the system 10 illustrated in FIG. 1, including a transport container 20 set down on transfer station 40. For example, the locking device of transport container 20 is also locked to the second locking unit of transfer station 40.

Figure 6:
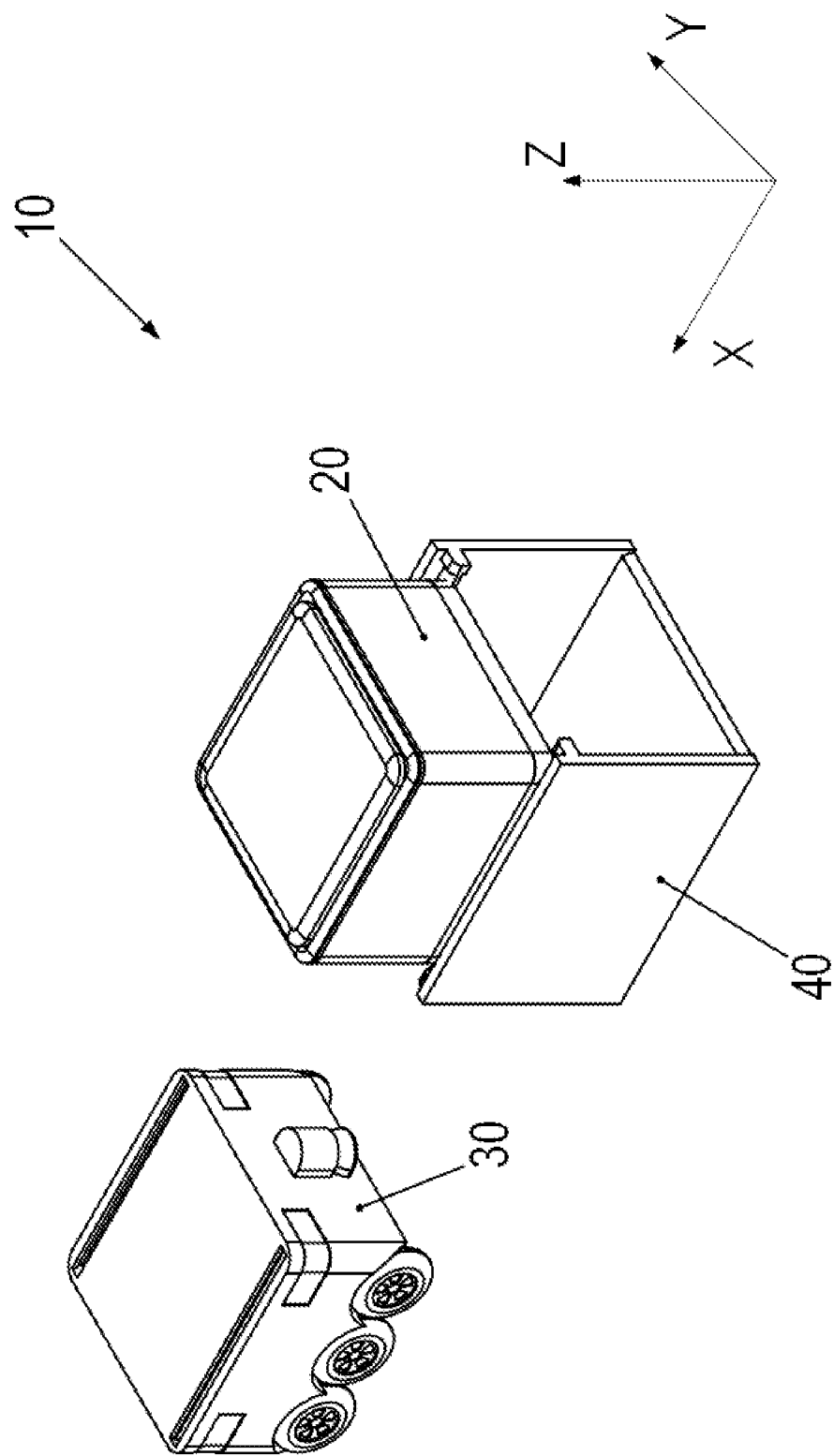
FIG. 6 illustrates the system illustrated in FIG. 1, including a driverless transport vehicle moving away.

Driverless transport vehicle 30 moves away from transfer station 40 and from transport container 20. FIG. 6 shows the system 10 illustrated FIG. 1, including a driverless transport vehicle 30 moving away. The locking device of transport container 20 is locked to the second locking unit of transfer station 40. For example, latches 22 of the locking device engage with support bars 42, which form the second locking unit of transfer station 40.

Figure 7:
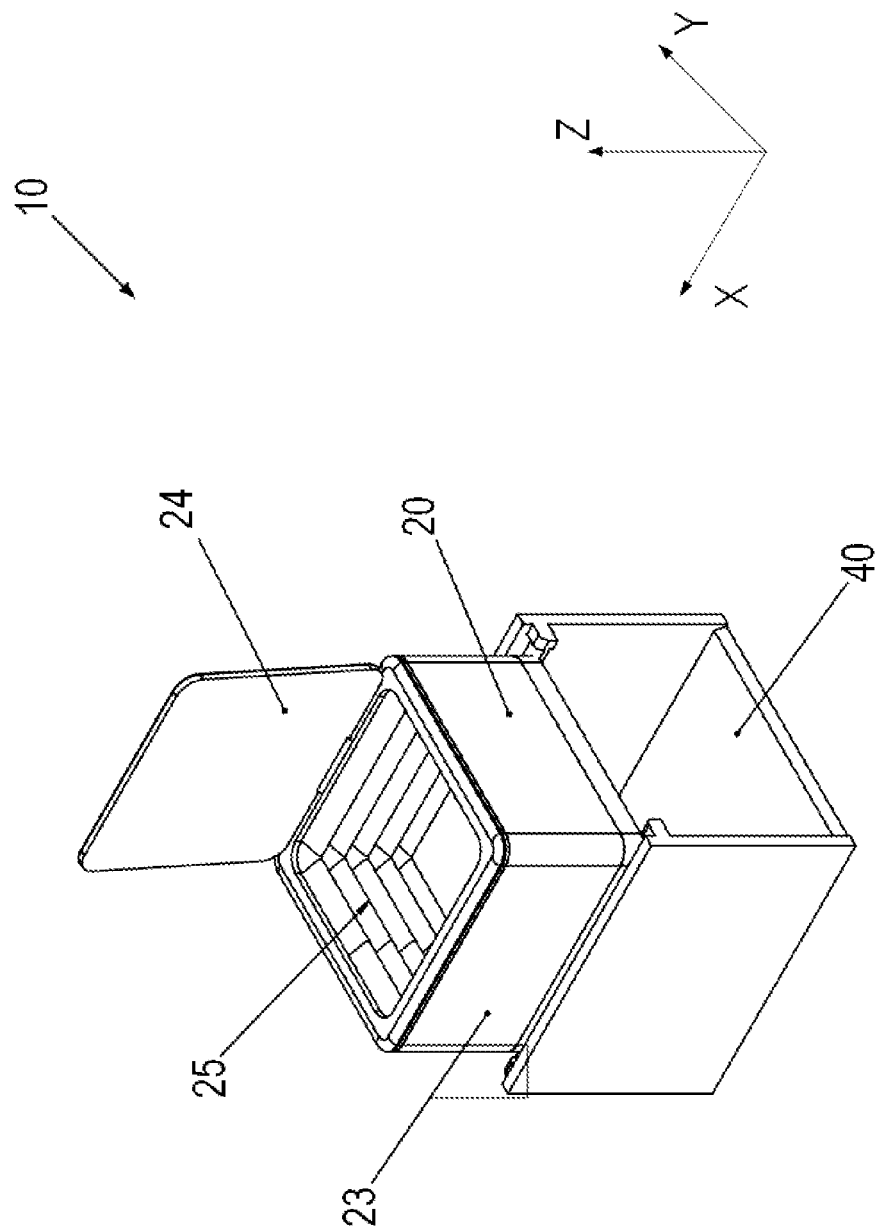
FIG. 7 illustrates the system illustrated in FIG. 1, including an open transport container.

FIG. 7 shows the system 10 illustrated in FIG. 1, including an open transport container 20. The recipient of the goods, e.g., a person authorized to open transport container 20, initially ends the locking of cover 24 to basic housing 23 caused by the locking module. Cover 24 is opened. The recipient removes the goods from hollow space 25 of transport container 20.

As an option, goods, which are to be transported away from transfer station 40, are placed into hollow space 25 of transport container 20. Cover 23 of transport container 20 is subsequently closed and locked to basic housing 24 by the locking module. For example, the locking device of transport container 20 is still locked to the second locking unit of transfer station 40.

Driverless transport vehicle 30 pulls into transfer station 40. With the aid of the control unit of driverless transport vehicle 30, the locking device of transport container 20 is unlocked from the second locking unit of transfer station 40. With the aid of the lifting unit of driverless transport vehicle 30, transport container 20 is raised, e.g., moved upwards in vertical direction Z.

Driverless transport vehicle 30 moves with transport container 20 out of transfer station 40, and transport container 20 is lowered by the lifting unit of driverless transport vehicle 30, e.g., moved downwards in vertical direction Z. The locking device of transport container 20 is locked to the first locking unit of driverless transport vehicle 30. Transport container 20 is subsequently transported away from transfer station 40 by driverless transport vehicle 30. As noted above, the driverless transport vehicle 30, the transfer station 40, and/or the transport container 20 may include a communications interface 36, 46, 26 respectively.

What is claimed is:

1. A system for transporting goods, comprising:
   a transfer station including a second locking unit;
   a transport container adapted to hold goods and adapted to be positioned on the transfer station; and
   a driverless transport vehicle adapted to transport the transport container and including a first locking unit;
   wherein the transport container includes a locking device adapted to lock to the first locking unit of the driverless transport vehicle and to the second locking unit of the transfer station;
   wherein the driverless transport vehicle includes a control unit adapted to unlock the locking device from the first locking unit and to unlock the locking device from the second locking unit; and
   wherein the locking device is adapted to automatically lock to the first locking unit or the second locking unit in the absence of the control unit.

2. The system according to claim 1, wherein the transport container includes at least one transport container, the driverless transport vehicle includes at least one driverless transport vehicle, and the transfer station includes at least one transport station.

3. The system according to claim 1, wherein the transport container includes at least one transport container, the driverless transport vehicle includes at least one driverless transport vehicle, and/or the transfer station includes at least one transport station.

4. The system according to claim 1, wherein the control unit is adapted to lock the locking device to the first locking unit and to lock the locking device to the second locking unit.

5. The system according to claim 1, wherein the driverless transport vehicle includes a lifting unit adapted to move the transport container in a vertical direction relative to a chassis of the driverless transport vehicle.

6. The system according to claim 1, wherein the driverless transport vehicle includes a communications interface adapted to communicate with the one transport container and/or with the transfer station.

7. The system according to claim 1, wherein the transfer station includes a communications interface adapted to communicate with the transport container and/or with the driverless transport vehicle.

8. The system according to claim 1, wherein the transport container includes a communications interface adapted to communicate with the driverless transport vehicle and/or with the transfer station.

9. The system according to claim 1, wherein the transport container includes a basic housing and a cover adapted to close the basic housing, the basic housing and the cover surround a hollow space adapted to receive the goods.

10. The system according to claim 9, wherein the transport container includes a locking module adapted to lock the cover to the basic housing.

11. The system according to claim 1, wherein the system is adapted to perform a method that includes:
locking a locking device of a transport container to a first locking unit of a driverless transport vehicle;
transporting the transport container by the driverless transport vehicle to a transfer station;
unlocking the locking device of the transport container from the first locking unit of the driverless transport vehicle; and
locking the locking device of the transport container to a second locking unit of the transfer station.

12. The system according to claim 1, wherein the transport container includes a plurality of transport containers, the driverless transport vehicle includes a plurality of driverless transport vehicles, and the transfer station includes a plurality of transport stations.

13. The system according to claim 1, wherein the transport container includes a plurality of transport containers, the driverless transport vehicle includes a plurality of driverless transport vehicles, and/or the transfer station includes a plurality of transport stations.

14. A method for transporting goods, comprising:
locking a locking device of a transport container to a first locking unit of a driverless transport vehicle;
transporting the transport container by the driverless transport vehicle to a transfer station;
unlocking the locking device of the transport container from the first locking unit of the driverless transport vehicle; and
locking the locking device of the transport container to a second locking unit of the transfer station;
wherein the driverless transport vehicle includes a control unit adapted to unlock the locking device from the first locking unit and to unlock the locking device from the second locking unit; and
wherein the locking device is adapted to automatically lock to the first locking unit or the second locking unit in the absence of the control unit.

15. The method according to claim 14, wherein a system for transporting the goods is adapted to perform the method, the system including:
the transfer station including the second locking unit;
the transport container adapted to hold the goods and adapted to be positioned on the transfer station; and
the driverless transport vehicle adapted to transport the transport container and including the first locking unit;
wherein the transport container includes the locking device adapted to lock to the first locking unit of the driverless transport vehicle and to the second locking unit of the transfer station.

16. The method according to claim 14, further comprising placing the goods into a hollow space of the transport container, before the transport container is transported by the driverless transport vehicle to the transfer station.

17. The method according to claim 14, further comprising placing the goods into a hollow space of the transport container, after the locking device of the transport container is locked to the second locking unit of the transfer station.

18. The method according to claim 14, wherein after the locking device of the transport container is locked to the second locking unit of the transfer station, the locking device of the transport container is unlocked from the second locking unit of the transfer station; the locking device of the transport container is locked to the first locking unit of the driverless transport vehicle; and the transport container is transported away from the transfer station by the driverless transport vehicle.

* * * * *